(12) United States Patent
Suzuki et al.

(10) Patent No.: US 9,364,860 B2
(45) Date of Patent: Jun. 14, 2016

(54) DECORATED RESIN MOLDED ARTICLE AND METHOD FOR PRODUCING THE SAME

(75) Inventors: Takane Suzuki, Toyota (JP); Hirotoshi Matsui, Toyota (JP); Kaoru Ito, Nisshin (JP); Masumi Noguchi, Anjo (JP)

(73) Assignee: Kojima Industries Corporation, Toyota-Shi (JP)

( * ) Notice: Subject to any disclaimer, the term of this patent is extended or adjusted under 35 U.S.C. 154(b) by 1121 days.

(21) Appl. No.: 12/202,596

(22) Filed: Sep. 2, 2008

(65) Prior Publication Data

US 2009/0068425 A1    Mar. 12, 2009

(30) Foreign Application Priority Data

Sep. 10, 2007  (JP) .................................. 2007-233620

(51) Int. Cl.
| | |
|---|---|
| B32B 3/10 | (2006.01) |
| C23C 16/06 | (2006.01) |
| B05D 7/02 | (2006.01) |
| B05D 5/06 | (2006.01) |
| B29C 45/00 | (2006.01) |
| B29L 9/00 | (2006.01) |
| B29L 31/30 | (2006.01) |
| B29L 31/00 | (2006.01) |

(52) U.S. Cl.
CPC *B05D 7/02* (2013.01); *B05D 5/067* (2013.01); *B05D 2350/65* (2013.01); *B29C 2045/0079* (2013.01); *B29L 2009/003* (2013.01); *B29L 2031/3005* (2013.01); *B29L 2031/722* (2013.01); *Y10T 428/24917* (2015.01)

(58) Field of Classification Search
USPC ............ 204/192; 428/636, 416, 457, 31, 412, 428/522, 523, 423.1, 335
See application file for complete search history.

(56) References Cited

U.S. PATENT DOCUMENTS

| | | | |
|---|---|---|---|
| 4,180,448 A * | 12/1979 | Soshiki et al. ................. | 430/216 |
| 4,214,016 A | 7/1980 | Manabe et al. | |
| 6,637,920 B2 | 10/2003 | Murakoshi et al. | |
| 7,086,766 B2 | 8/2006 | Inaba et al. | |
| 2004/0113899 A1* | 6/2004 | Nakayama ..................... | 345/204 |
| 2006/0172129 A1* | 8/2006 | Kanayama et al. ........... | 428/212 |
| 2006/0216442 A1* | 9/2006 | Kamiya et al. ................. | 428/31 |

FOREIGN PATENT DOCUMENTS

| | | |
|---|---|---|
| EP | 1 679 183 | 7/2006 |
| JP | 2001-312904 A1 | 11/2001 |
| JP | 2002-097334 A1 | 4/2002 |
| JP | 2004-174921 A1 | 6/2004 |
| JP | 2004-300566 A1 | 10/2004 |
| JP | 2006-175742 A1 | 7/2006 |
| JP | 2007-001247 A1 | 1/2007 |
| JP | 2009-045841 A1 | 3/2009 |
| WO | 02/01115 | 1/2002 |

* cited by examiner

*Primary Examiner* — Jennifer Chriss
*Assistant Examiner* — Ricardo E Lopez
(74) *Attorney, Agent, or Firm* — Burr & Brown, PLLC (57) ABSTRACT

A decorated resin molded article that can secure a high durability and can represent a sufficiently realistic metal texture in appearance is provided as follows. A metal thin film is directly formed on a design surface of a substrate by either a physical vapor deposition method or a chemical vapor deposition method to provide a metallic decoration. Additionally, a topcoat layer is formed with a thickness of 10 to 40 μm on the metal thin film. The topcoat layer comprises a transparent coating film having an adhesive property to both of the substrate and the metal thin film.

21 Claims, 2 Drawing Sheets

DECORATED RESIN MOLDED ARTICLE AND METHOD FOR PRODUCING THE SAME

The present application is based on Japanese Patent Application No. 2007-233620 filed on Sep. 10, 2007, the contents of which are incorporated herein by reference.

BACKGROUND OF THE INVENTION

1. Field of the Invention

The present invention relates to a decorated resin molded article and a method for producing the decorated resin molded article. More particularly, the invention relates to a decorated resin molded article having a metallic decoration applied on a design surface of a substrate constituted by a resin molded article, and to a method for advantageously producing the decorated resin molded article.

2. Description of the Related Art

As one type of decorated resin molded articles, there are known decorated resin molded articles each provided with a so-called metallic decoration in which a metallic surface in appearance is provided by forming, for example, a metallic coating film or a metal plating film on the design surface of a substrate constituted by a resin molded article (for example, see JP-A-2004-300566). The decorated resin molded articles have a lighter weight, better moldability, and higher processability than real metal products and do not require any rust prevention processing. Thus, they have been broadly used as surface skin materials, parts, or the like of various products and items such as automobile interior parts, furniture, building materials, home electric appliances, and mobile electronic apparatuses.

However, among the above conventional decorated resin molded articles, articles having a decoration provided by forming the metallic coating film on the design surface of the substrate tend to have an uneven appearance resulted from a difference of the amount of reflective light due to thickness irregularity of the metallic coating film, or tend to have a coating defect such as a "wave" or an "orange peel". This causes a deterioration of designability of a surface of the coating film, and ultimately, of the design surface decorated by the coating film. Furthermore, the articles having a decoration provided by forming the metal plating film on the design surface of the substrate have a problem that a harmful waste liquid is generated during a process for forming the metal plating film.

In the conventional decorated resin molded articles, the metallic coating film or the metal plating film is generally formed to have a relatively large thickness ranging from a few tens to a few hundreds μm on the design surface of the substrate. Thus, the shapes of corners and edges of the design surface become rounded, thereby inevitably losing sharp appearance that is particular to metal. Consequently, it is extremely difficult to sufficiently obtain a metal texture in appearance. Hereinafter, the metal texture is referred to as "realistic metal texture".

Under such circumstances, there is also proposed a decorated resin molded article having a metallic decoration provided by forming a metal film on a design surface of a substrate by a physical vapor deposition method such as sputtering or evaporation (for example, see U.S. Pat. No. 6,637,920 and JP-A-2004-174921). In those decorated resin molded articles, the metal film has an extremely thin and uniform thickness as compared to the metallic coating film, the metal plating film, and the like. In addition, no harmful waste liquid is generated during the formation process of the metal film. Therefore, the molded articles are free from problems such as the deterioration of designability and the safety issue during the production process, which inherently exist in the above conventional articles decorated by the metallic coating film or the metal plating film.

In the above decorated resin molded articles, generally, a topcoat layer (a protective layer) that has a high adhesiveness (cohesion) to metal and that is made of a transparent coating film is laminated on the metal film so as to protect the metal film having the extremely thin thickness. In addition, between the metal film and the design surface is provided an undercoat layer (a base layer) formed of a predetermined coating film to increase the adhesiveness of the metal film to the design surface. Furthermore, the undercoat layer prevents the design surface of the substrate from being eroded by a component part (for example, an organic solvent such as thinner) that is contained in the topcoat layer and that penetrates through the metal film. Thereby, durability of the decorated resin molded articles can be improved.

However, in the above-described conventional decorated resin molded articles that includes the undercoat layer, the metal film, and the topcoat layer which are laminated sequentially from a bottom side on the design surface, the undercoat layer is constituted by a coating film formed of a predetermined coating material which is applied on the design surface, and the undercoat layer has a thickness of 10 μm or more. Thus, also in the conventional decorated resin molded articles having the above-described structure, although the metal film has the sufficiently thin thickness, the corners and the edges of the design surface are made to have round shapes by the undercoat layer having the large thickness formed between the metal film and the design surface. Thereby, the molded articles inevitably appear less sharp and lack a somewhat realistic metal texture like the conventional decorated resin molded articles that have the decorations provided by the metallic coating film or the metal plating film as already described.

There is also known a decorated resin molded article in which a decoration is provided on a design surface by using a metal film formed by sputtering, and no undercoat layer is formed between the metal film and the design surface (for example, see U.S. Pat. No. 7,086,766). With the structure, it is expected that the corners and the edges of the design surface are sharpen and thus the "realistic metal texture" can be sufficiently represented. However, omission of the undercoat layer causes a reduction in the adhesiveness of the metal film to the design surface and also makes it difficult to prevent the erosion of the design surface of the substrate caused by the component part of the topcoat layer penetrated through the metal film. As a result, for example, the metal film is easily separated from the design surface, which result in reduction in the durability of the decorated resin molded article.

Along with the undercoat layer, the topcoat layer may also be omitted. However, the metal film cannot be protected without the topcoat layer, and it becomes difficult to prevent abrasion, separation, damage, or the like of the metal film, which are caused by contact of the metal film with another constituent member. In addition, it becomes difficult to secure a durability of the metal film against various chemicals or the like. Accordingly, also in this case, the durability of the decorated resin molded article is extremely deteriorated.

SUMMARY OF THE INVENTION

The present invention has been made in the light of the situations described above. It is therefore an object of the invention to provide a novel structure that secures a high durability and represents a sufficiently realistic metal texture in a decorated resin molded article provided with a metallic decoration on a design surface of a substrate constituted by a resin molded article. In addition, it is another object of the invention to provide a method for advantageously producing the decorated resin molded article having such a novel structure.

The inventors of the present invention conducted various examinations to solve the foregoing problems and found out that, when a metal thin film is formed on the design surface of the substrate by either a physical vapor deposition method or a chemical vapor deposition method without forming any undercoat layer in order to obtain the realistic metal texture, the metal thin film can be effectively protected and also the adhesiveness of the metal thin film to the design surface can be increased by forming a topcoat layer having a predetermined property and a thickness within a specific range on the metal thin film.

The present invention has been accomplished based on the above-described findings and the object may be achieved according to a first aspect of the invention, which provides a decorated resin molded article, including (a) a substrate having a design surface provided with a metallic decoration, the substrate being constituted by a resin molded article, (b) a metal thin film providing the metallic decoration on the design surface, the metal thin film being directly formed on the substrate by either a physical vapor deposition method or a chemical vapor deposition method; and (c) a topcoat layer having a thickness of 10 to 40 μm formed on the metal thin film, the topcoat layer being constituted by a transparent coating film having an adhesive property to both of the substrate and the metal thin film.

According to a preferable form of the first aspect of the present invention, the metal thin film has a thickness of 0.001 to 1 μm.

According to a preferable form of the first aspect of the present invention, the metal thin film is formed of a metallic material having a linear expansion coefficient of $6.0 \times 10^{-6}$ or more.

According to a preferable form of the first aspect of the present invention, the metal thin film is formed of any one kind of metallic materials selected from gold, silver, platinum, copper, aluminum, zinc, nickel, chrome, tin, titanium, and molybdenum, or an alloy material comprising two or more kinds of metallic materials selected therefrom.

According to a preferable form of the first aspect of the present invention, the metal thin film is formed of stainless steel.

According to a preferable form of the first aspect of the present invention, the resin molded article constituting the substrate is formed of an amorphous resin material.

According to a preferable form of the first aspect of the present invention, the resin molded article constituting the substrate is formed of a microcrystalline resin. In this case, the microcrystalline resin is a crystalline resin having a thermal crystallization temperature (Tc) of lower than a melting point by 10° C. or more and is hereinafter used in the same meaning. Examples of the microcrystalline resins include polyethylene terephthalate (PET) resins and polybutylene terephthalate (PBT) resins.

According to a preferable form of the first aspect of the present invention, the resin molded article constituting the substrate is formed of a mixture of an amorphous resin and a microcrystalline resin material.

According to a preferable form of the first aspect of the present invention, the transparent coating film is formed of a coating material including a matting agent.

According to a preferable form of the first aspect of the present invention, the transparent coating film is a colored transparent coating film.

According to a preferable form of the first aspect of the present invention, the transparent coating film is formed of a two-liquid reactive-type coating material comprising a first liquid containing a first component and a second liquid containing a second component, the first component having a functional group exhibiting an adhesiveness to resin and the second component having a functional group exhibiting an adhesiveness to metal.

According to a preferable form of the first aspect of the present invention, on the design surface of the substrate is provided with a first decorated portion having a pattern formed by at least one of a large number of fine concave portions and a large number of fine convex portions, and the metal thin film is directly formed on the first decorated portion by either the physical vapor deposition method or the chemical vapor deposition method to provide the metallic decoration on the design surface.

According to a preferable form of the first aspect of the present invention, on the design surface of the substrate is provided with a second decorated portion having an even and smooth surface, the metal thin film is directly formed on the second decorated portion by either the physical vapor deposition method or the chemical vapor deposition method to provide the metallic decoration on the design surface.

According to a preferable form of the first aspect of the present invention, at least two kinds of decorated portions selected from the group consisting of plural kinds of first decorated portions and a second decorated portion are provided so as to adjacent to each other on the design surface of the substrate, the first decorated portions having patterns formed by at least one of a large number of fine concave portions and a large number of fine convex portions in which depths of the concave portions, heights of the convex portions, or kinds of the patterns are mutually different and the second decorated portion having an even and smooth surface, and wherein the metal thin film is directly formed on the at least two kinds of the decorated portions by either the physical vapor deposition method or the chemical vapor deposition method to provide a plural kinds of metallic decorations having different appearances on the design surface.

According to a preferable form of the first aspect of the present invention, the decorated resin molded article is an automobile interior part.

Furthermore, the another object regarding the method for producing a decorated resin molded article may be achieved according to a second aspect of the invention, which provides a method for producing a decorated resin molded article having a metallic decoration on a design surface of a substrate constituted by a resin molded article, the method includes the steps of: (a) directly forming a metal thin film on the design surface of the substrate by either a physical vapor deposition method or a chemical vapor deposition method to provide the metallic decoration; and (b) forming a topcoat layer having a thickness of 10 to 40 μm on the metal thin film, the topcoat layer being formed of a transparent coating film having an adhesive property to both of the substrate and the metal thin film.

In the decorated resin molded article according to the present invention, the metal thin film is directly formed on the design surface by either the physical vapor deposition method or the chemical vapor deposition method. Thus, the thickness of the metal thin film is made sufficiently smaller than that of a coating film formed by metallic coating or that of a plating film formed by metal plating, for example. In addition, unlike the conventional decorated resin molded articles having the metal thin film formed on the design surface by the physical vapor deposition method, the article according to the present invention includes no undercoat layer between the metal thin film and the design surface. Accordingly, the corners and the edges of the design surface are directly covered by the extremely thin metal film, whereby the corners and the edges thereof can be sharpened as much as a real metal product.

In the decorated resin molded article according to the present invention, particularly, the topcoat layer is constituted by the transparent coating film having the adhesive property to both of the substrate and the metal thin film. Thus, although the article according to the present invention does not include the undercoat layer between the metal thin film and the design surface, which is provided in the conventional decorated molded articles in order to increase the adhesiveness of the metal thin film to the design surface, the article of the present invention can favorably increase the adhesiveness of the metal thin film to the design surface. The reason for this is not clear, but may be attributed to the fact that the metal thin film formed by either the physical vapor deposition method or the chemical vapor deposition method has a porous form with a large number of communication holes mutually communicating an inside of the film with an outside thereof, whereby a component part of the topcoat layer adhered to the metal thin film penetrates into the metal thin film through the communication holes to adhere to both of the metal thin film and the design surface of the substrate.

In addition, in the decorated resin molded article according to the present invention, the topcoat layer has the thickness of 10 μm or more, thereby sufficiently exhibiting an inherent function of the topcoat layer, namely, the function of protecting the metal thin film by preventing abrasion, separation, damage, or the like caused by contact or the like of the metal thin film with another member and ensuring durability against various chemicals or the like. Furthermore, an upper limit of the thickness of the topcoat layer is set at 40 μm so as to be sufficiently thinner than that of the topcoat layer formed on the design surface in the conventional decorated resin molded articles. Thereby, the amount of a component eroding the substrate, which is contained in the topcoat layer (specifically, a coating material forming the topcoat layer), is favorably reduced. As a result, although the undercoat layer is not provided, it is possible to maximally prevent erosion of the substrate and easy separation of the metal thin film caused by a component part contained in the topcoat layer and penetrated through the metal thin film.

Therefore, in the decorated resin molded article having the above-described structure according to the present invention, the topcoat layer can effectively protect the metal thin film and also can favorably increase the adhesiveness of the metal thin film to the design surface. Accordingly, the metal thin film, and ultimately the decorated resin molded article as a whole can effectively ensure a high durability. Moreover, since the corners and the edges of the design surface can be sharpened as a real metal product, a "realistic metal texture" can be sufficiently represented.

Furthermore, in the method for producing a decorated resin molded article according to the second aspect of the present invention, the decorated resin molded article that ensures the high durability and effectively presents the sufficiently realistic metal texture can be more efficiently produced at a lower cost due to the absence of a undercoat layer.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

To further clarify the present invention, there will be described a preferred embodiment of the invention by referring to the drawings.

Figure 1:
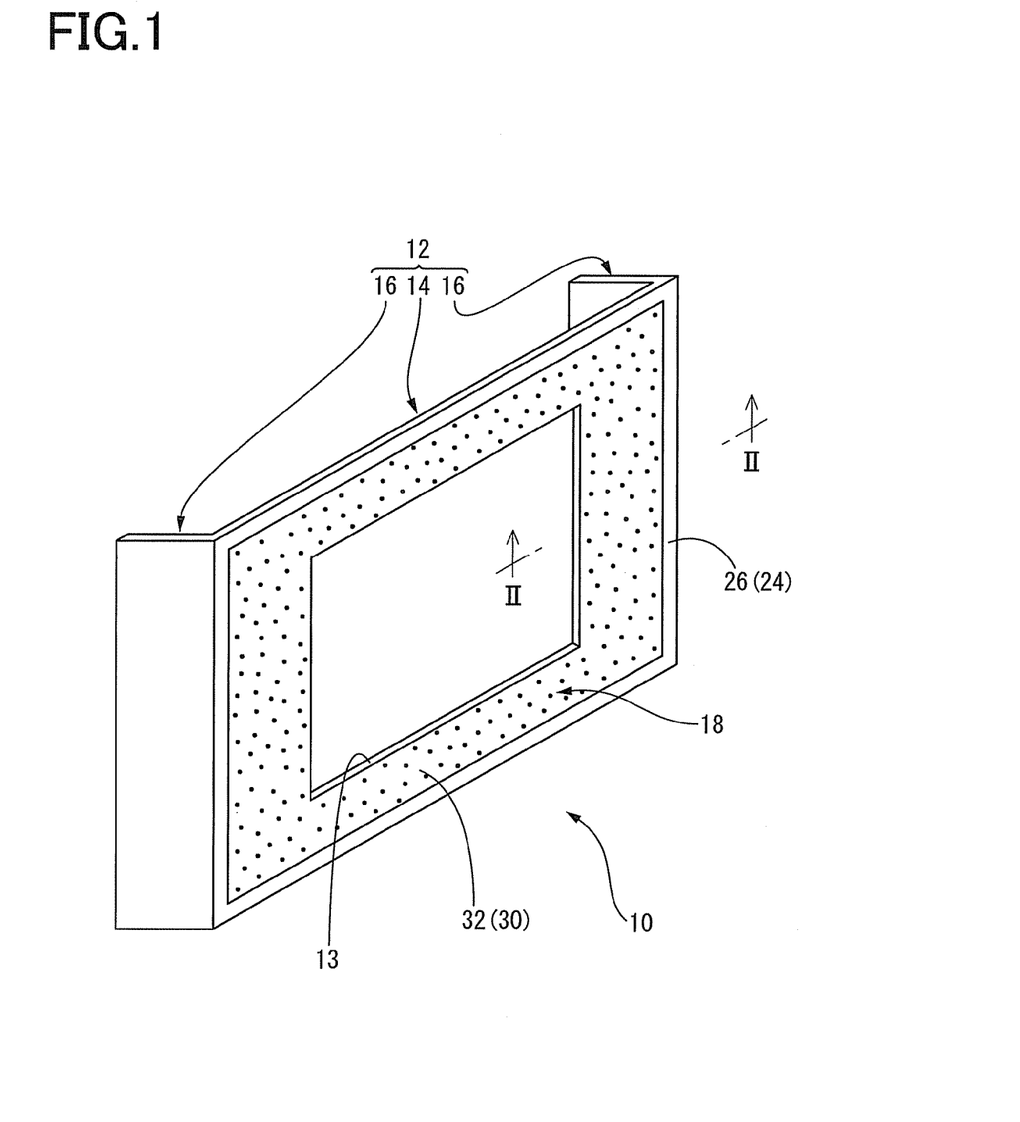
FIG. 1 is a perspective view showing a decorated resin molded article according to an embodiment of the present invention.
Figure 2:
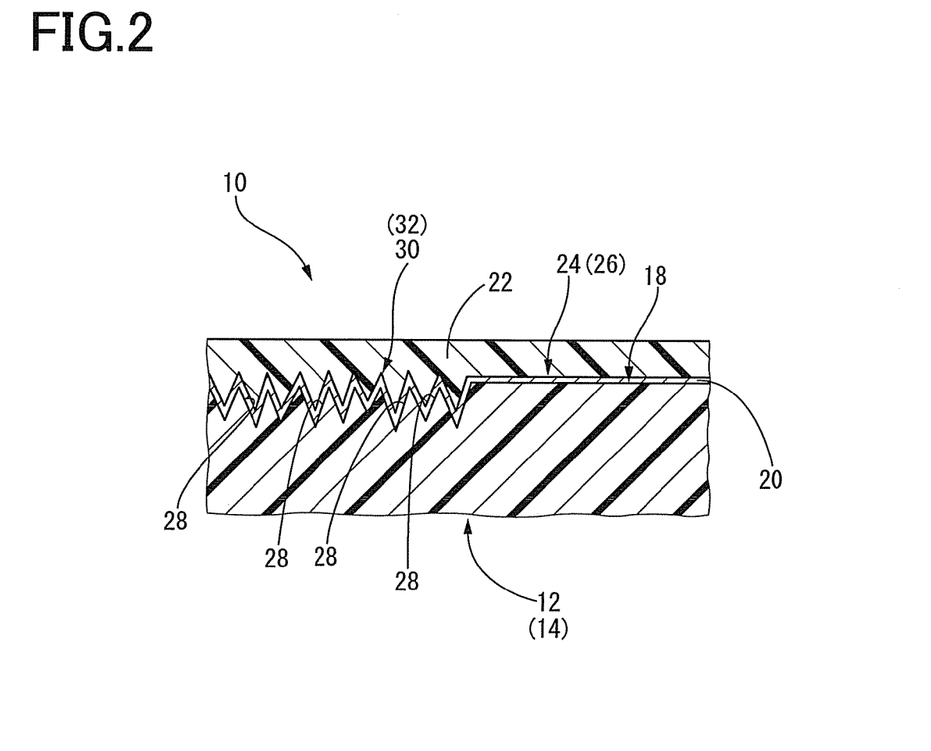
FIG. 2 is a partly enlarged view showing a cross sectional view taken along line II-II of FIG. 1.

Referring first to FIGS. 1 and 2, there are shown a perspective view and a partial sectional view, respectively, schematically showing a cover panel which is an automobile interior part incorporated in an automobile instrument panel as an embodiment of a decorated resin molded article according to the present invention. As apparent from the drawings, a cover panel 10 of the present embodiment has a substrate or base member 12 that is constituted by a resin molded article and that has a metallic decoration provided thereon.

Described more specifically, the substrate 12 of the cover panel 10 includes a rectangular frame portion 14 which has a longitudinal rectangular window portion 13 in a central part of a substantially thin and longitudinally rectangular plate and two attachment portions 16, 16 which are each integrally formed with each of opposite ends of the frame portion 14 in a longitudinal direction thereof and are each extended to one side of a plate thickness direction. In the substrate 12, a surface opposite to a surface of the frame portion 14 having the attachment portions 16, 16 thereon, namely, a surface of the cover panel 10 (a surface exposed to a vehicle room under installation of the cover panel on the instrument panel) is referred to as a design surface 18. On the design surface 18 of the substrate 12, an extremely thin metal film 20 is directly formed so as to entirely cover the design surface 18. In addition, on a side (an upper side) of the metal film 20 opposite to a side of the design surface 18, a topcoat layer 22 constituted by a transparent coating film is directly formed.

In other words, in the present embodiment, the metal film 20 and the topcoat layer 22 are directly formed on the design surface 18 of the substrate 12 constituted by the resin molded article in this order from a lower side. The metal film 20 is overall formed on the design surface 18 of the substrate 12, whereby the metallic decoration is applied to the design surface 18 of the substrate 12. In this manner, on the surface of the cover panel 10 (the frame portion 14), color, glossiness, and the like particular to metal are expressed so as to provide a metallic surface in appearance. Additionally, the topcoat layer 22 is laminated on the metal film 20, whereby the metal film 20 is protected by the topcoat layer 22. As a result, abrasion, separation, damage, or the like due to contact or the like of the metal film 20 with another component is prevented and durability of the metal film 20 against various chemicals or the like is sufficiently ensured.

The substrate 12 of the cover panel 10 is constituted by the resin molded article to secure excellent moldability, processability, and also lightweight of the cover panel 10 as a whole. In view of this point, a resin material forming the substrate 12 is not particularly limited to a specific kind of resin, as long as an easy forming technique such as molding can be employed. Thus, as described above, in the present embodiment, the extremely thin metal film 20 is directly formed on the design surface 18 of the substrate 12 and an undercoat layer that is formed between the design surface 18 and the metal film 20 in the conventional molded article is omitted. Accordingly, uneven portions of design surface cannot be concealed by the undercoat layer. Therefore, in order to stably secure a desired designability, it is preferable that no unnecessary uneven portion is present on the design surface 18.

Preferable examples of the constituent material of the substrate 12 include amorphous resins such as acrylonitrile butadiene styrene (ABS) resin, acrylonitrile-acrylic rubber-styrene (AAS) resin, acrylonitrile-ethylene/propylene rubber-styrene copolymer (AES) resin, polycarbonate (PC), poly (methyl methacrylate) (PMMA), and polystyrene (PS), and so-called microcrystalline resins such as polyethylene terephthalate (PET) and polybutylene terephthalate (PBT), which have a relatively large difference between a thermal crystallization temperature (Tc) and a melting point among crystalline resins, and specifically, which have a thermal crystallization temperature (Tc) of 10 or more ° C. lower than the melting point. Any one kind alone or a combination of two or more kinds selected from the above examples may be preferably employed. This can maximally prevent the formation of an unnecessary uneven portion on the design surface 18.

The resin molded article molded by using any amorphous resin selected from the exemplified resin materials has a relatively small mold shrinkage factor. Accordingly, the molded article formed by molding has a feature that any sink mark and any weld line hardly occur. The resin molded article molded by using any microcrystalline resin among the above exemplified resin materials is characterized by that either any weld line or any sink mark hardly occurs since the thermal crystallization temperature (Tc) is sufficiently lower than the melting point. Even the resin molded article molded by using a mixture of any of the amorphous resins and any of the microcrystalline resins exemplified above also has the characteristic that neither sink mark nor weld line occurs. Therefore, when any exemplified amorphous rein, microcrystalline resin, or any mixture thereof is used to mold the substrate 12, it is possible to maximally prevent the formation of an unnecessary uneven portion caused by weld line or sink mark on the design surface 18 of the substrate 12. This can make it possible to maximally prevent the occurrence of an unnecessary uneven portion on the extremely thin metal film 20 formed on the design surface 18. In addition, it can be maximally prevented that designability of the design surface 18 metallically decorated by the metal film 20 is deteriorated by a presence of such an unnecessary uneven portion.

In the present embodiment, particularly, on the design surface 18 of the substrate 12, the metal film 20 is directly formed, for example, by a physical vapor deposition (PVD) process such as vacuum deposition, sputtering, or ion plating, or a chemical vapor deposition (CVD) process such as a thermal CVD process, a plasma CVD process, or an photo CVD process. Thereby, the thickness of the metal film 20 is made extremely thinner than the thickness of a metal film constituted by a plating film or a coating film formed, for example, by performing metal plating or metal coating on the design surface 18. Additionally, between the metal film 20 and the design surface 18, there is no undercoat layer, which is provided in the conventional molded article to increase an adhesiveness of the metal film 20 to the design surface 18, for example.

Thus, in the cover panel 10 according to the present embodiment, edges, corners, or the like of an outer periphery of the design surface 18 are made more angular in shape, unlike conventional articles in which a thick plating film or a thick coating film is formed on the design surface 18 of the substrate 12 or in which an undercoat layer is provided between the metal film 20 and the design surface 18. This can provide metal's inherent sharp impression to viewers.

A thickness of the thin metal film 20 is not particularly limited, but in the present embodiment, the thickness of the metal film 20 may range from about 0.001 to 1 µm, for example. If the thickness of the metal film 20 is less than 0.001 µm, the metal film 20 is too thin. This makes it difficult not only to obtain a uniform film thickness, but also to express the metal color, the glossiness, or the like on the design surface 18, so that the metallic film 20 may not provide metallic surface in appearance. Meanwhile, if the thickness of the metal film 20 exceeds 1 µm, the metal film is too thick, so that the edges, the corners, or the like of the outer periphery of the design surface 18 have a round shape. As a result, the edges and the corners thereof are likely to lack sharpness. Thus, it is preferable that the thickness of the metal film 20 is set in the range of 0.001 to 1 µm, whereby a more fully realistic metal texture can be surely represented on the design surface 18. To more effectively obtain such an effect, it is more preferable that the thickness of the metal film 20 may be set in a range of 0.005 to 0.1 µm.

In general, a linear expansion coefficient of resin is ten times smaller than that of metal. If there is a great difference between a linear expansion coefficient of the substrate 12 constituted by the resin molded article and that of the metal film 20, the metal film 20 cannot be thermally deformed together with the substrate 12 when the substrate 12 is thermally expanded or contracted due to rapid heating, rapid cooling, or the like of the cover panel 10. In this case, a crack or a wrinkle may be caused on the metal film 20. Conversely, the thermal deformation of the substrate 12 caused by rapid heating, rapid cooling or the like of the cover panel 10 may be blocked or inhibited by the metal film 20, whereby distortion may occur on the substrate 12. Thus, it is preferable that the linear expansion coefficient of the metal film 20 is maximally close to that of the substrate 12 constituted by the resin molded article.

Accordingly, in the present embodiment, a metallic material having a linear expansion coefficient of $6.0 \times 10^{-6}$ or more, for example, is employed to form the metal film 20. Thereby, it can effectively prevent the occurrence of any crack or wrinkle on the metal film 20, the occurrence of distortion on the substrate 12, or the like caused by the difference of the linear expansion coefficient between the metal film 20 and the substrate 12, when the cover panel 10 is thermally deformed. Thus, it is preferable that the linear expansion coefficient of the metallic material forming the metal film 20 is $6.0 \times 10^{-6}$ or more. This can maximally prevent the occurrence of any crack, wrinkle, or the like of the metal film 20, so that a stable quality of the article can be ensured over a long period of time.

The problem of causing a crack, a wrinkle or the like on the metal film 20 due to the difference of the linear expansion coefficient between the metal film 20 and the substrate 12 becomes more obvious as the thickness of the metal film 20 is increased. Particularly it becomes noticeable when the thickness thereof exceeds 1 µm. Thus, even when the metal film 20 is made of the metallic material having the linear expansion coefficient of $6.0 \times 10^{-6}$ or more, it is preferable that the thickness of the metal film 20 is less than 1 µm in order to prevent the occurrence of a crack, wrinkle or the like of the metal film 20.

The kind of the metallic material of the metal film 20 is not specifically limited as long as the metal film 20 can be directly formed on the design surface 18 of the substrate 12 by the physical vapor deposition method or the chemical vapor deposition method described above. In the present embodiment, to obtain the foregoing advantages, the constituent material of the metal film 20 is preferably made of any one of metallic materials selected from gold, silver, platinum, copper, aluminum, zinc, nickel, chrome, tin, titanium, and molybdenum which has the linear expansion coefficient of $6.0 \times 10^{-6}$ or more, or an alloy material made of two or more kinds of metallic materials selected therefrom. In addition, the constituent material may be made of stainless steel that has the linear expansion coefficient of $6.0 \times 10^{-6}$ or more. The stainless steel may have a general composition (Fe+Cr/Fe+Cr+Ni) or a composition that further contains any one or more kinds of metallic material selected from gold, silver, platinum, copper, aluminum, zinc, tin, titanium, and molybdenum in addition to the general composition.

As is apparent from FIGS. 1 and 2, in the cover panel 10 of the present embodiment, an outer peripheral portion of the design surface 18 of the substrate 12, which is an outer surface of the frame portion 14, is referred to as a decorated smooth surface portion 24, which is a second decorated portion having an even and smooth surface. The metal film 20 is formed on the decorated smooth surface portion 24 so as to entirely cover the surface portion. Thereby, at the outer peripheral portion of the surface of the frame portion 14, there is formed a smooth mirror surface portion 26 subjected to a metallic decoration, which looks as if it was subjected to a mirror surface processing in such a manner that the mirror surface portion 26 extends over an entire periphery of the outer peripheral portion.

On an entire area except for the decorated smooth surface portion 24 on the design surface 18 of the substrate 12, there are directly and densely provided a plurality of fine crepe concave portions 28 having mutually different depths and sizes. The area having the plurality of fine crepe concave portions 28 formed thereon is referred to as a decorated patterned surface portion 30 which is a first decorated portion where a fine crepe pattern is formed, unlike the decorated smooth surface portion 24 having the even and smooth surface portion. The metal film 20 is also formed over the decorated patterned surface portion 30 so as to entirely cover the surface. Thereby, an entire area of the frame portion 14 excluding the mirror surface portion 26 provided on the outer periphery thereof is referred to as a crepe pattern portion 32 to which the metallic decoration having the fine crepe patterns is applied.

Thus, in the cover panel 10 of the present embodiment, the mirror surface portion 26 and the crepe pattern portion 32 are positioned adjacently to each other on the surface of the frame portion 14 constituted by the single substrate 12 (namely on the design surface 18 of the substrate 12). Thereby, at their adjacent positions on the surface of the frame portion 14, there are provided two kinds of the metallic decorations having mutually different appearances as a result of the presence or absence of the patterns. Consequently, the cover panel 10 can provide an impression to viewers as if the frame portion 14 is constituted by an integral assembly of the two kinds of metal members that have the surfaces provided with mutually different three-dimensional textures.

In the present embodiment, the large number of crepe concave portions 28 provided on the design surface 18 have sufficiently small depths and opening areas. Specifically, the depth and the opening area of the crepe concave portion 28 are set such that, in an instance when a metal plating film or a metallic coating film thicker than the metal film 20 is formed on the design surface 18 with the large number of crepe concave portions 28, each of the crepe concave portions 28 is embedded in the metal plating film or the metallic coating film and thereby a surface of the metal plating or metallic coating film becomes smooth, while in an instance when the sufficiently thin metal film 20 is formed on the design surface 18, concave portions corresponding to each of the crepe concave portions 28 are formed on the metal film 20. Thus, on the design surface 18, there is formed the fine and dense crepe pattern provided by the crepe pattern portion 32, which absolutely cannot be obtained in any conventional decorated resin molded article decorated by forming the metal plating film or the metallic coating film.

Meanwhile, the topcoat layer 22, which is directly laminated on the metal film 20 directly provided on the design surface 18, is constituted by a coating film which is formed, for example, by applying a transparent coating material entirely over the metal film 20. Particularly, the coating film which constitutes the topcoat layer 22 has an adhesive property to both of the substrate 12 constituted by the resin molded article and the metal film 20. In other words, in this embodiment, the coating material forming the topcoat layer 22 has a good adhesive property to both of the resin, which is a high polymer organic material, and the metal, which is an inorganic material.

Accordingly, although the cover panel 10 of the present embodiment has no undercoat layer that is formed between the metal film 20 and the design surface 18 to improve the adhesiveness of the metal film 20 to the design surface 18 in the conventional product, the adhesiveness thereof to the design surface 18 of the substrate 12 is advantageously increased. As described in detail above, the reason for this is uncertain, however, it may be attributed to the following. That is, the coating material forming the topcoat layer 22 exercises the good adhesiveness to metal and adheres to the surface of the metal film 20. Then, a part of the coating material penetrates into the metal film 20 through communication holes of the porous metal film 20 formed by the physical or the chemical vapor deposition process. The part of the coating material penetrated into the metal film 20 exercises the good adhesiveness to both of resin and metal and allows the metal film 20 to strongly adhere to the design surface 18 of the substrate 12.

The coating material forming the topcoat layer 22 is not limited to a specific kind of material as long as it is a transparent material having the adhesiveness to both of resin and metal. For example, the coating material of the topcoat layer 22 may be any one selected from various transparent coating materials such as two-liquid reactive-type coating material, UV cured type coating material, and thermal cured type coating material. Among them, the present embodiment employs a transparent two-liquid reactive-type coating material. The transparent two-liquid reactive-type coating material comprises two liquid components, one of which is a base resin and the other one of which is any one of a curing agent, a cross-linking agent, and the like. Any one of the two liquid components has a functional group having an adhesiveness to resin (the substrate 12) and the other liquid component has a functional group having an adhesiveness to metal (the metal film 20). Thereby, unlike the instance when a UV cured type coating material or a thermal cured type coating material is employed, the coating material can be cured at a room temperature without using a special apparatus such as an ultraviolet ray irradiation apparatus or a heater. As a result, an improvement of production efficiency and cost reduction in a formation process of the topcoat layer 22 can be favorably achieved. Examples of such transparent two-liquid reactive-type coating materials include transparent acrylic-silicone based coating material and transparent acrylic-urethane based coating material.

Furthermore, in the present embodiment, the coating material of the topcoat layer 22 contains a matting agent. In short, the topcoat layer 22 is constituted by a transparent matted coating film. This appropriately reduces light reflectance of the entire design surface 18 of the substrate 12, namely, the whole surface of the cover panel 10. Consequently, the matting agent can effectively reduce the amount of glare of light that is reflected on the mirror surface portion 26 and that reach a passenger's eyes when the cover panel 10 is assembled to the instrument panel of a motor vehicle. Additionally, a metallic appearance with an oxidized silver tone can be favorably obtained. The matting agent used in the embodiment may be suitably selected from known materials such as alumina, finely-divided silica, and polyethylene microparticles.

The topcoat layer 22 needs to be transparent so as to allow the metallic glossiness and metallic color of the metal film 20 to be visually recognized from an outside of the product, but does not always need to be colorless. For example, the topcoat layer 22 may be colored with the same color as the color of the instrument panel to which the cover panel 10 assembled, or may be colored with a color that is suited to a design of the cover panel 10 and that is different from the color of the instrument panel, or the like. Since a real metallic product may reflect an ambient color tone and emit a bluish or yellowish color, the topcoat layer 22 may be colored with a color which is generated when such an ambient color tone is reflected. This can provide an appearance more similar to a real metallic product to the cover panel 10.

In particular, the topcoat layer 22 of the present invention is formed to have a thickness of 10 to 40 μm, which is thinner than the thicknesses of the conventional products formed by laminating the undercoat layer, the thin metal film, and the topcoat layer on the design surface of the substrate. If a thickness thereof is less than 10 μm, the topcoat layer 22 is too thin and thus cannot effectively protect the metal film 20. As a result, it can be extremely difficult not only to prevent abrasion, separation, damage, or the like due to contact or the like of the metal film 20 with another constituent member, but also to secure durability against various chemicals or the like. On the other hand, if the topcoat layer 22 has a thickness more than 40 μm, the amount of the coating material used to form the topcoat layer 22 is increased. The increase results in an increase in a ratio of a component contained in the coating material, namely, the ratio of a component eroding the substrate 12, which is contained in the topcoat layer 22 (for example, an organic solvent such as thinner). Accordingly, a large amount of the component which erodes the substrate 12 and is contained in the topcoat layer 22 penetrates through the metal film 20 and erodes the substrate 12. Thereby, the metal film 20 may be more easily separated.

In the cover panel 10 of the present embodiment, the topcoat layer 22 is formed to have a thickness of 10 to 40 μm, whereby, while effectively protecting the metal film 20, the deterioration of the adhesiveness of the metal film 20 to the substrate 12 is favorably prevented, which is resulted from the erosion of the substrate 12 caused by the component part contained in the topcoat layer 22.

The cover panel 10 of the embodiment having the above structure is produced according to the following process, for example.

Initially, the substrate 12 integrally having the frame portion 14 provided with the window portion 13 and the two attachment portions 16, 16 is molded, for example, by performing a metallic molding such as injection molding with the above-exemplified resin material. On a molding cavity surface of an injection die used for the above molding are provided with an area having a large number of extremely fine convex portions corresponding to the extremely fine crepe concave portions 28 provided on the decorated patterned surface portion 30 of the substrate 12 and an area subjected to mirror surface polishing so as to correspond to the decorated smooth surface portion 24 of the substrate 12. These areas are arranged to adjacent to each other. Thereby, simultaneously with the molding of the substrate 12, the decorated patterned surface portion 30 and the decorated smooth surface portion 24 are formed on the design surface 18 of the substrate 12 in such a manner that these portions are adjacent to each other.

For example, a method for forming the extremely fine convex portions corresponding to the extremely fine crepe concave portions 28 on the molding cavity surface of the die which is used in the present process can be any one selected from known methods such as shot blasting, etching, and polishing, which are typically performed to form predetermined concave-convex portions on the molding cavity surface of the die. Among those methods, the methods such as shot blasting and polishing may be preferably used, which makes shapes, sizes, depths and the like of concave portions and convex portions formed on the molding cavity surface uneven. As a result, a variety of shapes, sizes, depths, and the like are provided in the crepe pattern formed by the concave portions that have shapes corresponding to the convex portions or the like formed on the molding cavity surface and that are formed on the surface of the intended cover panel 10 (the surface of the frame portion 14). Accordingly, the cover panel 10 finally obtained after applying the metallic decoration thereon can have a more realistic metal texture.

In order to obtain a more realistic metal texture in the finally obtained cover panel 10, it is preferable that the decorated smooth surface portion 24 provided on the design surface 18 of the substrate 12 has a higher smoothness and flatness. Accordingly, on the molding cavity surface of the die, for example, a mirror surface polished by a 3000 grit or finer sandpaper or sandstone provides a mirror polished portion corresponding to the decorated smooth surface portion 24. Additionally, a preferable die material may be a prehardened material that enables precise processing or a material that hardly generates any pinhole.

As a resin material forming the substrate 12, it is preferable to employ a material which has a good transferability such that each surface shape of the mirror polished cavity surface portion and the cavity surface portion having the fine convex portions formed thereon can be surely transferred and also has a minimum mold shrinkage factor to prevent the occurrence of any sink mark or the like. Accordingly, in the embodiment, among the above exemplified constituent material of the substrate 12, it is particularly preferable to use materials having a spiral flow length of 30 or more, which is measured by a spiral flow test mathod, and a mold shrinkage factor of 10/1000 or less. Additionally, in order to increase fluidity of the resin material forming the substrate 12 at the time of melting, any component mixed in the resin material has preferably a miniaturized particle diameter.

Additionally, in order to allow the decorated smooth surface portion 24 provided on the design surface 18 of the substrate 12 to have a further higher smoothness and flatness and allow the extremely fine crepe concave portions 28 to be more surely formed on the decorated patterned surface portion 30, it is preferable to mold the substrate 12 under appropriate molding conditions. Specifically, when the substrate 12 is molded by injection molding, preferably, a die temperature is 95° C. or higher and an injection velocity or speed is 140 mm/s or faster. In order to stably maintain a sufficient fluidity of the resin material in a die body, it is also effective to provide an extra tab or to dispose a rod heater or the like at a part of the die body. The molding of the substrate 12 may be performed by rapidly cooling and rapidly heating the die.

A color of the resin material forming the substrate 12 molded in the foregoing manner is not limited to a specific one, and any desired color may be selected. For example, a colorless transparent or colored transparent resin material may be used to make the substrate 12 colorless or colored transparent. In that case, when the ambient environment is bright, a metal glossiness is exhibited on the surface of the cover panel 10. When the ambient environment is dark, for example, a light-emitting diode (LED) or the like arranged on a back surface of the cover panel 10 is allowed to emit light, so as to leak out the light to the surface of the cover panel 10. Thereby, optical designability can be effectively exhibited. When the substrate 12 is colored transparent and parts thereof have different color densities, light emission from the LED or the like arranged on the back surface of the cover panel 10 can exhibit brightness of the light in gradation.

Next, on the design surface 18 of the substrate 12 (the surface of the frame portion 14) formed as described above, the metal film 20 is formed with a sufficiently thin thickness by either the physical or the chemical vapor deposition method so as to entirely cover the design surface 18. As the material of the metal film 20, an appropriate one that has a desired metal color, metal glossiness, and the like is selected from the above exemplified metallic materials.

From the reason described above, it is preferable that the metal film 20 has the thickness ranging from about 0.001 to 1 μm. Thus, in the present process, favorably, the physical or the chemical vapor deposition process is performed using the desired metallic material under condition in which the metal film 20 to be formed is allowed to have a thickness of about 0.001 to 1 μm. Additionally, it is preferable to employ a condition in which the metal film 20 is formed with a high density. For example, when sputtering method is used, it may be performed under an atmosphere with a relatively low pressure of about 0.1 Pa, for example. This can maximally prevent penetration of the component part, which is contained in the topcoat layer 22 laminated on the metal film 20 and erodes the substrate 12, into the metal film 20, so that the erosion of the metal film 20 by the component can be more effectively prevented.

Next, for example, a transparent coating material having the adhesive property to both of resin and metal is applied on an entire surface of the metal film 20 formed on the design surface 18 of the substrate 12. Thereby, the topcoat layer 22 comprising a coating film made of the coating material is formed with the thickness ranging from 10 to 40 μm so as to cover the entire surface of the metal film 20. As a result, the intended cover panel 10 can be obtained.

In the formation of the topcoat layer 22 made of the predetermined coating film, among known coating methods such as coating using a roller or the like, spray coating, and dipping coating, a method capable of forming a coating film having the thickness ranging from 10 to 40 μm is suitably selected.

In this manner, in the cover panel 10 of the embodiment, the metal film 20 having a sufficiently thin thickness is directly formed on the design surface 18 of the substrate 12 by either the physical or the chemical vapor deposition method, whereby the metallic decoration is provided. This enables the metallic surface on the surface of the frame portion 14 to be favorably represented with a more realistic metal texture which provides a sharp impression.

In the cover panel 10, the topcoat layer 22 is formed on a side of the metal film 20 opposite to the side of the design surface 18. The topcoat layer 22 comprises the transparent coating film having the adhesiveness to both of the substrate 12 and the metal film 20 and the topcoat layer 22 is formed to have the thickness ranging from 10 to 40 μm. Accordingly, although no undercoat layer is formed between the metal film 20 and the design surface 18 to increase the adhesiveness of the metal film 20 to the design surface 18, the metal film 20 can strongly adhere to the design surface 18. Additionally, while protecting the metal film 20 by the topcoat layer 22, it is possible to maximally prevent easy separation of the metal film 20, which is resulted from erosion of the substrate 12 caused by penetration of the component part of the topcoat layer 22 penetrated through the metal film.

Thus, in the cover panel 10 of the present embodiment formed as above, the metal film 20, and ultimately the cover panel 10 as a whole can advantageously ensure a high level of durability. In addition, the metal film 20 can provide more realistic metal surface.

Additionally, in the cover panel 10, on the design surface 18 of the substrate 12, there is provided the decorated patterned surface portion 30 having the large number of extremely fine crepe concave portions 28. Then, on the surface portion 30, the sufficiently thin metal film 20 is laminated such that the extremely fine crepe concave portions 28 are not buried, whereby the fine and dense crepe pattern is provided on the design surface 18 by the crepe pattern portion 32. Therefore, the cover panel 10 of the present embodiment can novelly and effectively represent the metallic surface having the fine and dense crepe pattern with the more sufficiently realistic metal texture, which cannot be obtained, for example, by the conventional decorated resin molded article in which the metal plating film or the metallic coating film is formed on the design surface to apply metallic decoration, the conventional decorated resin molded article in which the undercoat layer is formed between the design surface 18 and the metal film 20, and the like.

In the present embodiment, on the design surface 18 of the substrate 12 is provided the decorated smooth surface portion 24 having the smooth and flat surface. Further, the sufficiently thin metal film 20 is formed on the decorated smooth surface portion 24 so as to provide the mirror surface portion 26 on the design surface 18. Thereby, the metal surface having a mirror surface can be favorably represented on the surface of the cover panel 10.

In the present embodiment, the metal film 20 is formed on the entire surface of each of the decorated smooth surface portion 24 and the decorated patterned surface portion 30 that are provided in mutually adjacent positions on the design surface 18 of the substrate 12. In this manner, the design surface 18 thereof is provided with the two kinds of metallic decorations having mutually different appearances including the mirror surface and the crepe pattern. This can provide the impression to viewers as if the frame portion 14 is constituted by the integrated assembly of the two kinds of metal members having the surfaces with mutually different three-dimensional textures. As a result, a sufficiently expensive-looking can be favorably exhibited.

Furthermore, the cover panel 10 of the present embodiment is provided with the two kinds of metallic decorations having the mutually different appearances on the design surface 18 of the absolute single substrate 12. Thus, for example, unlike a cover panel constituted by an integrated assembly of two kinds of metallic members, the cover panel 10 is free from problems such as the occurrence of an abnormal sound caused by contact between the metallic members. Moreover, it is also possible to completely eliminate any extra workload and cost imposed for the prevention of such abnormal sounds in the production thereof.

Therefore, the cover panel 10 of the present embodiment can be effectively provided with a higher quality and expensive looking in addition to the high level of durability and the sufficiently realistic metal texture, although the cover panel 10 has a simple and low-cost structure.

In the cover panel 10 of the present embodiment, the metal film 20 has the thickness ranging from 0.001 to 1 µm, whereby the metallic surface can be more realistically represented on the design surface 18. Additionally, the metal film 20 is made of the metallic material having the linear expansion coefficient of $6.0 \times 10^{-6}$ or more, which makes it possible to maximally prevent the occurrence of any crack or any wrinkle on the metal film 20 caused by the thermal deformation of the substrate 12, thereby advantageously ensuring a stable quality of the panel.

Furthermore, the cover panel 10 of the present embodiment does not include an undercoat layer. Thereby the simplification of its production process and the reduction in its production cost can be advantageously achieved due to the elimination of the layer.

In the production of the cover panel 10 of the present embodiment, the substrate 12 is molded by using the molding die with the molded cavity surface having portions for forming the decorated smooth surface portion 24 and the decorated patterned surface portion 30 on the design surface 18 of the substrate 12. At the same time, the decorated smooth surface portion 24 and the decorated patterned surface portion 30 are formed such that they are located adjacently to each other on the design surface 18 of the substrate 12. Accordingly, a plurality of the cover panels 10 can be easily produced with a high efficiency, a high productivity, and also a uniform quality through the one production process, for example.

Hereinafter, a detailed description will be given of an examinations performed by the inventors of the present invention to confirm that the cover panel 10 of the present embodiment has the above-described characteristics.

Initially, four sheets of planar substrates were molded and prepared, where the planar substrates were ABS resin plates each having a length of 150 mm, a width of 150 mm, and a thickness of 3 mm. As a material of a metal film, a predetermined amount of a SUS 316 stainless steel with a linear expansion coefficient of $15.9 \times 10^{-6}$ was prepared. As a material of a topcoat layer, there was prepared a predetermined amount of a two-liquid reactive-type coating material comprising transparent acrylic silicon and having the adhesiveness to both of the substrates and the metal film.

Next, on a surface of each of the four planar substrates was formed the metal film made of the SUS 316 stainless steel having a thickness of 0.04 µm by a known sputtering method. Subsequently, the two-liquid reactive-type coating material comprising acrylic silicon was coated on each of the metal films formed on the surfaces of the planar substrates by spraying to form coating films having different thicknesses of 5 µm, 10 µm, 40 µm, and 45 µm. In this manner, four kinds of decorated resin molded articles were obtained, in which the metal film was formed on the surface of each planar substrate and a metallic decoration was applied thereon, and further the topcoat layers made of the two-liquid reactive-type coating material comprising acrylic silicon were laminated with the mutually different thicknesses on the metal films.

Then, using the obtained four kinds of the decorated resin molded articles, evaluation examinations were performed on the metal film of each of the decorated resin molded articles regarding eight items shown in each of Tables 1 and 2 below. Table 1 shows results of the evaluation examinations of the two kinds of decorated resin molded articles including the topcoat layers having the thicknesses of 10 µm and 40 µm, respectively, which fall in the range of the present invention. Table 2 shows results of the evaluation examinations of the other two kinds of the decorated resin molded articles including the topcoat layers having the thicknesses of 5 µm and 45 µm, respectively, which fall out of the range of the present invention.

Among the eight items of the evaluation examinations, "appearances" were evaluated by the presence or absence of abnormality which result in a defective appearance such as any orange peel, wave, crack, and wrinkle. The presence or absence of abnormality was determined by visually inspecting the metal film of each decorated resin mold article from an outside. A normal appearance was evaluated as being good, whereas an appearance with abnormality was evaluated as being bad. "Pencil hardness" was determined by performing a scratch hardness test on the surface of each of the decorated resin molded articles in accordance with Japanese Industrial Standards (JIS) K5600-5-4. The results which showed HB or harder was evaluated as being good, whereas results of softer than HB were evaluated as being bad. "Adhesiveness" was evaluated by the presence or absence of separation of the metal film. Specifically, slits were formed in a lattice pattern on the surface of each decorated resin molded article and an adhesive tape was attached thereon. Then, the tape was suddenly peeled off. As a result, a good evaluation was given to the article having no separated spot out of 100 spots of the metal film, whereas a bad evaluation was given to the article having one or more separated spots out of 100 spots. "Impact resistance" was evaluated using a DuPont type impact tester. A weight of 300 g was dropped from a height of 20 cm on the metal film of each molded article and the presence or absence of any crack and separation of the metal film was checked. Then, the article having no crack or separation of the metal film was evaluated as being good, whereas the article with any crack or separation thereof was evaluated as being bad. "Adhesion under moisture condition" was evaluated by measuring an adhesiveness of each decorated resin molded article left for long hours in an atmosphere with a temperature of 50° C. and a high humidity of 95% or higher. The same conditions and operation as in the above adhesiveness examinations were employed. Consequently, the article having no separated spot out of 100 spots of the metal film was evaluated as being good and the article having one or more separated spots out of 100 spots was evaluated as being bad. "Abrasion resistance" was evaluated by the presence or absence of separation of the metal film. The presence or absence of separation was visually checked after rubbing the article surface having the metal film thereon 200 or more times by using coarse sandpaper (grit numbers ranging from about 10 to 30). As a result, a good evaluation was given to the article that had no separation of the metal film after rubbing the surface 200 times or more with the sandpaper, whereas a bad evaluation was given to the article that had any separation thereof. "Accelerated lightfastness" was tested for each decorated resin molded article by measuring a color difference ΔE after a long-hour irradiation of a predetermined amount of ultraviolet light on each decorated resin molded article by using a known method. As a result, the article with ΔE equal to or less than 3.0 was evaluated as being good and the article with ΔE larger than 3.0 was evaluated as being bad. Furthermore, "adhesion after cold-hot cycle test" was examined by measuring the adhesiveness of each decorated resin molded article left in an atmosphere with a temperature changed repeatedly every one to a few hours in a range of −30 to 90° C. and with a high humidity of 95% or higher. The same conditions and operation as in the above adhesiveness examinations were employed. As a result, a good evaluation was given to the article which had no separated spot out of 100 spots of the metal film, whereas a bad evaluation was given to the article which had one or more separated spots out of 100 spots.

TABLE 1

| Evaluation item | Criteria for evaluation | Thickness of topcoat layer | | | |
|---|---|---|---|---|---|
| | | 10 μm | | 40 μm | |
| Appearance | Normal | Normal | Good | Normal | Good |
| Pencil hardness | HB or harder | H | Good | H | Good |
| Adhesiveness | 0/100 | 0/100 | Good | 0/100 | Good |
| Impact resistance | Normal | Normal | Good | Normal | Good |
| Adhesion under moisture condition | 0/100 | 0/100 | Good | 0/100 | Good |
| Abrasion resistance | 200 or more times | 1000 or more times | Good | 1000 or more times | Good |
| Accelerated lightfastness | ΔE ≤ 3.0 | 2.45 | Good | 1.52 | Good |
| Adhesion after cold-hot cycle test | 0/100 | 0/100 | Good | 0/100 | Good |

TABLE 2

| Evaluation item | Criteria for evaluation | Thickness of topcoat layer | | | |
|---|---|---|---|---|---|
| | | 5 μm | | 45 μm | |
| Appearance | Normal | Orange peel | Bad | Crack | Bad |
| Pencil hardness | HB or harder | HB | Good | H | Good |
| Adhesiveness | 0/100 | 0/100 | Good | 0/100 | Good |
| Impact resistance | Normal | Normal | Good | Crack | Bad |
| Adhesion under moisture condition | 0/100 | 0/100 | Good | 0/100 | Good |
| Abrasion resistance | 200 or more times | 500 times | Good | 1000 or more times | Good |
| Accelerated lightfastness | ΔE ≤ 3.0 | 3.3 | Bad | 1.44 | Good |
| Adhesion after cold-hot cycle test | 0/100 | 13/100 | Bad | 0/100 | Good |

As apparent from the results of Table 1, the good evaluation was given to all the eight items in the two kinds of the decorated resin molded articles including the topcoat layer formed by sputtering and having a thicknesses of 10 and 40 μm, respectively, which fall in the range defined in the present invention.

On the other hand, as apparent from the results of Table 2, the bad evaluation was given to the three items, namely, the appearance, the accelerated lightfastness, and the adhesion after cold-hot cycle test in the decorated resin molded article including the topcoat layer having the thickness of 5 μm, which is thinner than the range defined in the present invention. Thereby, it can be clearly recognized that when the thickness of the topcoat layer was smaller than the lowest limit defined in the present invention, not only an appearance defect occurred on the metal film, and ultimately on the decorated resin molded article, but also the durability of the article was deteriorated.

In addition, the bad evaluation was given to the appearance of the decorated resin molded article including the topcoat layer having the thickness of 45 μm, which is thicker than the range defined in the present invention. Thereby, it can be recognized that an appearance defect occurred on the metal film, and ultimately on the decorated resin molded article. Furthermore, the bad evaluation was given to the impact resistance of the decorated resin molded article. It may be attributed to the fact that the substrate surface was eroded by the component part of the topcoat layer penetrated through the metal film, which facilitated the separation of the metal film. In view of these, it can be understood that an appearance defect and a reduction in the adhesiveness of the metal film to the substrate are occurred when the thickness of the topcoat layer is thicker than the range defined in the present invention.

A detailed description will be given of examinations performed by the present inventors to determine relationships between linear expansion coefficients of the metal film and film thicknesses with respect to the quality of the cover panel 10 of the present embodiment.

Initially, 16 sheets of planar substrates were molded and prepared, where the planar substrate were ABS resin plates each having a length of 150 mm, a width of 150 mm, and a thickness of 3 mm. Additionally, there were prepared four kinds of metallic materials made of molybdenum, chrome, a nickel-chrome alloy (Ni:Cr=80:20), and SUS 316 stainless steel each having a linear expansion coefficient shown in Table 3.

Then, using four of the 16 planar substrates and molybdenum, each metal film made of molybdenum was formed with mutually different thicknesses (0.001 μm, 0.04 μm, 1 μm, and 1.2 μm, respectively) on each of the surfaces of the four planar substrates by a known sputtering method. Thereby, there were obtained four kinds of decorated resin molded articles each having a metallic decoration applied on the surface thereof by the metal film made of molybdenum. Then, in the same manner, metal films made of chrome having mutually different thicknesses were formed on the surfaces of other four planar substrates, and metal films made of the nickel-chrome alloy (Ni:CR=80:20) with mutually different thicknesses were formed on the surfaces of other four planar substrates. Furthermore, metal films made of SUS 316 stainless steel having mutually different thicknesses were formed on the surfaces of the remaining four planar substrates. Consequently, there were formed the metal films made of the different kinds of the metallic materials or having the mutually different thicknesses, namely, 16 kinds of the decorated resin molded articles were obtained that have the metallic decorations on the surfaces thereof.

Next, the obtained 16 kinds of the decorated resin molded articles were left for 240 hours under an environment of a temperature of 50° C. and a humidity of 95%. Thereafter, while keeping the humidity of 95%, the articles were left for 15.5 hours at 80° C., for 0.5 hours at 20° C., for 7.5 hours at 30° C., for 0.5 hours at 20° C., for 15.5 hours at 49° C., for 0.5 hours at 20° C., for 7.5 hours at 30° C., and for 0.5 hours at 20° C. This process was repeated four cycles in the same order. Following that, appearance was visually inspected to determine the presence or absence of any crack on the metal films formed on the 16 kinds of the decorated resin molded articles. Table 3 below shows the results of the inspections. Besides the appearance inspections, a tape separation test in a lattice pattern was performed on each of the 16 kinds of the decorated resin molded articles in accordance with the JIS K5400 to determine the presence or absence of the separation of the metal film. The test results are also shown together in Table 3 below. In Table 3, good evaluations were given to the articles in which no crack was found in the appearance inspections and no metal-film separation was found in the tape separation tests. Meanwhile, bad evaluations were given to the articles in which any crack and/or metal-film separation was found in the appearance test and/or the tape separation test.

TABLE 3

| | Linear expansion coefficient (×10$^{-6}$) | Film thickness (μm) | | | |
|---|---|---|---|---|---|
| | | 0.001 | 0.04 | 1.0 | 1.2 |
| Mo | 4.9 | Good | Bad | Bad | Bad |
| Cr | 6.2 | Good | Good | Bad | Bad |
| Ni—Cr alloy | 11 | Good | Good | Good | Bad |
| SUS316 | 15.9 | Good | Good | Good | Bad |

As apparent from the results of Table 3, in the decorated resin molded articles decorated by the metal film having the linear expansion coefficient of 6.0×10$^{-6}$ or more, although there is a tendency in which a thinner film is preferable, it is generally possible to favorably prevent the occurrence of crack in the metal film and the reduction in the adhesiveness of the metal film to the substrate due to ambient temperature changes, namely, due to thermal deformation of the substrate caused by the temperature changes. Additionally, it can be recognized that as the thickness of the metal film is decreased, the crack and the reduction in adhesiveness of the metal film to the substrate can be favorably prevented. Furthermore, it can be recognized that, in order to more favorably prevent the above problems, it is preferable that the metal film is made of the metallic material having the linear expansion coefficient of 6.0×10$^{-6}$ or more and the thickness of from 0.001 μm to less than 1 μm.

While the present invention has been described in detail, for the illustrative purpose only, it is to be understood that the invention is not limited to the details of the illustrated embodiment.

For example, in the above embodiment, on the design surface 18 of the substrate 12 are provided with the two kinds of decorated portions, namely, the decorated smooth surface portion 24 as the second decorated portion having the smooth flat surface and the decorated patterned surface portion 30 as the first decorated portion having the large number of the fine crepe concave portions 28. However, on the design surface 18 of the substrate 12, there may be formed only one of the decorated portions, selected from the decorated smooth surface portion 24 and the decorated patterned surface portion 30.

Additionally, for example, those decorated portions provided on the design surface 18 of the substrate 12 may be comprised of two kinds of the first decorated portions having mutually different patterns or may be comprised of three or more kinds of the first decorated portions. Alternatively, a plurality of kinds of the first decorated portions having various patterns may be combined with the second decorated portion having no pattern.

The pattern formed on the first decorated portion may be simply comprised of only a large number of fine concave portions or only a large number of fine convex portions. Furthermore, the pattern may be comprised of a combination of the large number of the fine concave portions and the fine convex portions.

The pattern of the first decorated portion is not limited to the exemplified crepe pattern and may be any one of various known patterns such as hair-line patterns, geometrical patterns, amorphous patterns, and patterns made of various kinds of characters and symbols, for example. Examples of the geometrical patterns include any single kind of patterns having same or mutually different sizes selected from circles, ovals, ellipses, polygons, line segments (including straight lines, flexure lines, curved lines, and wavy lines), and patterns formed by a combination of two or more kinds thereof selected from the foregoing patterns. Examples of the geometrical pattern formed by including circles, ovals, ellipses, or polygons include geometrical patterns in which only visible outlines of the shapes is made of concave grooves or convex portions, and in which inside of the visible outlines is entirely or partly made concave or convex.

When the plurality of kinds of the first decorated portions are provided on the design surface 18 of the substrate 12, the patterns of the first decorated portions having the same shapes may form a combination of different kinds of patterns by having the concave portions and the convex portions in which depths, heights, widths, lengths, and the like thereof are mutually different.

Each one of the first decorated portions does not always have to include only a single kind of pattern. Each one of the decorated portions may include a plurality of kinds of patterns.

The depths and the heights of the concave portions and the convex portions forming the pattern on the first decorated portion are not necessarily uniform. They may be wholly irregular, may be partly different from other parts, or may be irregular in one part thereof.

The thickness of the topcoat layer 22 does not always have to be uniform as long as the thickness thereof ranges from 10 to 40 μm.

A plurality of surfaces of the substrate each may be used as a design surface.

When the first and the second decorated portions are provided adjacently to each other on the design surface of the substrate, at a boundary between those first and second decorated portions may be formed a joint portion such as a V-shaped groove, a U-shaped groove, a rectangular groove, or a stepped portion that is formed by lowering either one of the first and the second decorated portions than the other. This can provide a deeper impression to viewers as if the respective portions decorated by forming the metal film on the first and the second decorated portions are made of different members. Consequently, the cover panel 10 can more surely obtain the sufficiently expensive looking.

The convex portions and the concave portions providing various patterns on the surface of the decorated resin molded article are formed as the above described method. Specifically, the substrate is molded by the die having the mold cavity surface provided with the concave and convex portions corresponding to the large number of fine convex portions and the concave portions to be formed on the first decorated portion. Thus, at the same time, the first decorated portion is formed on the design surface of the substrate and then the metal film is formed thereon. Other than the above-described method, another method may be employed in which the substrate is molded by a die having a mold cavity surface including neither concave nor convex portions, then, the metal film is formed on the design surface of the substrate, and thereafter, a large number of fine convex and concave portions are formed on the surface of the metal film. Thereby, a plurality of the decorated resin molded articles can be favorably produced with individually different textures and appearances and with a high originality. Additionally, in order to form the large number of the fine convex and concave portions on the surface of the metal film, a method that does not damage the extremely thin metal film may be suitably employed among known methods generally performed to form predetermined concave and convex portions on a surface of a resin molded article. Examples of the known methods include shot blasting (for example, sand blasting), etching, polishing and the like.

In the above embodiment, the present invention has been described by using the detailed example of the cover panel assembled to the instrument panel, which is a kind of an automobile interior part, and the detailed example of the method for manufacturing the cover panel. However, it is to be understood that the present invention may be advantageously applied to any automobile interior part other than cover panels and a method for production thereof, and any decorated resin molded article other than automobile interior parts and a method for production thereof.

While the concrete structure of the decorated resin molded article has been described as the preferred embodiment of the invention, the principle of the invention is equally applicable to decorated resin molded articles having various alternative forms. It is to be understood that the present invention may be embodied with various other changes and modifications which may occur to those skilled in the art, without departing from the spirit and scope of the invention.

What is claimed is:

1. A decorated resin molded article, comprising:
   a substrate having a design surface provided with a metallic decoration, the substrate consisting of a resin molded article;
   a metal thin film providing the metallic decoration on the design surface, the metal thin film having a large number of communication holes and being directly formed on the substrate by either a physical vapor deposition method or a chemical vapor deposition method; and
   a topcoat layer having a thickness of 10 to 40 µm formed on the metal thin film, the topcoat layer being constituted by a transparent coating film having an adhesive property to both of the substrate and the metal thin film,
   wherein a portion of the topcoat layer extends through the communication holes and adheres to both the metal thin film and the substrate, whereby the metal thin film adheres to the substrate.

2. The decorated resin molded article according to claim 1, wherein the metal thin film has a thickness of 0.001 to 1 µm.

3. The decorated resin molded article according to claim 1, wherein the metal thin film is formed of a metallic material having a linear expansion coefficient of $6.0 \times 10^{-6}$ or more.

4. The decorated resin molded article according to claim 3, wherein the metal thin film is formed of any one kind of metallic materials selected from gold, silver, platinum, copper, aluminum, zinc, nickel, chrome, tin, titanium, and molybdenum or an alloy material comprising two or more kinds of metallic materials selected therefrom.

5. The decorated resin molded article according to claim 3, wherein the metal thin film is formed of a stainless steel.

6. The decorated resin molded article according to claim 1, wherein the resin molded article constituting the substrate is formed of an amorphous resin material.

7. The decorated resin molded article according to claim 1, wherein the resin molded article constituting the substrate is formed of a microcrystalline resin material.

8. The decorated resin molded article according to claim 1, wherein the resin molded article constituting the substrate is formed of a mixture of an amorphous resin material and a microcrystalline resin material.

9. The decorated resin molded article according to claim 1, wherein the transparent coating film is formed of a coating material including a matting agent.

10. The decorated resin molded article according to claim 1, wherein the transparent coating film is a colored transparent coating film.

11. The decorated resin molded article according to claim 1, wherein the transparent coating film is formed of a two-liquid reactive-type coating material comprising a first liquid containing a first component and a second liquid containing a second component, the first component having a functional group exhibiting an adhesiveness to resin and the second component having a functional group exhibiting an adhesiveness to metal.

12. The decorated resin molded article according to claim 1, wherein on the design surface of the substrate is provided with a first decorated portion having a pattern formed by at least one of a large number of fine concave portions and a large number of fine convex portions, and
   wherein the metal thin film is directly formed on the first decorated portion by either the physical vapor deposition method or the chemical vapor deposition method to provide the metallic decoration on the design surface.

13. The decorated resin molded article according to claim 1, wherein on the design surface of the substrate is provided with a second decorated portion having an even and smooth surface, and
   wherein the metal thin film is directly formed on the second decorated portion by either the physical vapor deposition method or the chemical vapor deposition method to provide the metallic decoration on the design surface.

14. The decorated resin molded article according to claim 1, wherein at least two kinds of decorated portions selected from the group consisting of plural kinds of first decorated portions and a second decorated portion are provided so as to adjacent to each other on the design surface of the substrate, the first decorated portions having patterns formed by at least one of a large number of fine concave portions and a large number of fine convex portions in which depths of the concave portions, heights of the convex portions, or kinds of the patterns are mutually different and the second decorated portion having an even and smooth surface, and
   wherein the metal thin film is directly formed on the at least two kinds of the decorated portions by either the physical vapor deposition method or the chemical vapor deposition method to provide a plural kinds of metallic decorations having different appearances on the design surface.

15. The decorated resin molded article according to claim 1, wherein the decorated resin molded article is an automobile interior part.

16. A method for producing a decorated resin molded article having a metallic decoration on a design surface of a substrate consisting of a resin molded article, the method comprising the steps of:
   directly forming a metal thin film having a large number of communication holes on the design surface of the substrate by either a physical vapor deposition method or a chemical vapor deposition method to provide the metallic decoration; and
   forming a topcoat layer having a thickness of 10 to 40 µm on the metal thin film, the topcoat layer being formed of a transparent coating film having an adhesive property to both of the substrate and the metal thin film,
   wherein a portion of the topcoat layer extends through the communication holes and adheres to the metal thin film and the substrate, whereby the metal thin film adheres to the substrate.

17. A method for producing a decorated resin molded article according to claim 16, wherein the metal thin film has said communication holes that communicate through the metal thin film through which components of the topcoat layer can penetrate, and wherein the component of the topcoat layer penetrates into the metal thin film through said communication holes allowing the topcoat layer to adhere to both the substrate and the metal thin film.

18. The decorated resin molded article according to claim 1, wherein the substrate is formed of at least one of acrylonitrile butadiene styrene (ABS) resin, acrylonitrile-acrylic rubber-styrene (AAS) resin, and acrylonitrile-ethylene/propylene rubber-styrene copolymer (AES) resin.

19. The decorated resin molded article according to claim 1, wherein the topcoat layer defines an uppermost surface of the decorated resin molded article.

20. The decorated resin molded article according to claim 1, wherein the material of the topcoat is different from the material of the substrate.

21. The decorated resin molded article according to claim 1, wherein the topcoat layer is cured at room temperature without the application of heat.

* * * * *